United States Patent

Hebert

[11] Patent Number: 6,070,423
[45] Date of Patent: Jun. 6, 2000

[54] BUILDING EXHAUST AND AIR CONDITIONER CONDENSTATE (AND/OR OTHER WATER SOURCE) EVAPORATIVE REFRIGERANT SUBCOOL/PRECOOL SYSTEM AND METHOD THEREFOR

[76] Inventor: Thomas H. Hebert, 1340 Eastwood Dr., Lutz, Fla. 33612

[21] Appl. No.: 09/168,822

[22] Filed: Oct. 8, 1998

[51] Int. Cl.[7] ................................................. F25B 47/00
[52] U.S. Cl. .............................................. 62/277; 62/305
[58] Field of Search ............................. 62/277, 278, 280, 62/305, 279

[56] References Cited

U.S. PATENT DOCUMENTS

| | | |
|---|---|---|
| 1,891,538 | 12/1932 | Hicks . |
| 2,124,291 | 7/1938 | Fleisher . |
| 2,255,585 | 9/1941 | Hubacker . |
| 2,350,408 | 6/1944 | McGrath . |
| 2,351,695 | 6/1944 | Newton . |
| 2,776,543 | 1/1957 | Ellenberger . |
| 2,938,361 | 5/1960 | McNatt . |
| 3,264,839 | 8/1966 | Harnish . |
| 3,537,274 | 11/1970 | Tilney . |
| 3,902,551 | 9/1975 | Lim et al. . |
| 4,023,949 | 5/1977 | Schlom et al. ................. 62/92 |
| 4,320,629 | 3/1982 | Nakagawa et al. . |
| 4,373,346 | 2/1983 | Hebert et al. ................. 62/79 |
| 4,375,753 | 3/1983 | Imasu et al. . |
| 4,380,910 | 4/1983 | Hood et al. ................. 62/91 |
| 4,542,786 | 9/1985 | Anders . |
| 4,574,868 | 3/1986 | Anders . |
| 4,599,870 | 7/1986 | Hebert . |
| 4,679,404 | 7/1987 | Alsenz . |
| 4,873,837 | 10/1989 | Murray . |
| 5,205,347 | 4/1993 | Hughes . |
| 5,345,778 | 9/1994 | Roberts . |
| 5,465,591 | 11/1995 | Cur et al. . |
| 5,485,732 | 1/1996 | Locatelli . |
| 5,613,554 | 3/1997 | Bull et al. . |

FOREIGN PATENT DOCUMENTS

| | | |
|---|---|---|
| 559983 | 9/1983 | European Pat. Off. . |
| 2056652 | 3/1981 | United Kingdom . |

*Primary Examiner*—Henry Bennett
*Assistant Examiner*—Melvin Jones
*Attorney, Agent, or Firm*—Stein, Schifino & Van Der Wall

[57] ABSTRACT

First, a system for providing liquid refrigerant subcooling, subsequent to that subcooling accomplished by the primary condenser of an air conditioner or heat pump, by means of evaporative cooling utilizing the condensate water of said air conditioner or heat pump system and/or some other water supply to wet the surface of the subcool heat exchanger and then passing the cold, dry building exhaust air required for good indoor air quality across the wetted surface of the subcool heat exchanger. Said exhaust air could be used after first undergoing a sensible heat exchange with the incoming make up air. Said subcooling providing for an increased refrigeration capacity, and efficiency of the system.

Secondly, a system for providing hot gas discharge refrigerant precooling before said hot gas passes into the primary condenser of an air conditioner or heat pump, by means of evaporative cooling utilizing the condensate water of said air conditioner or heat pump system and/or some other water supply to wet the surface of the precool heat exchanger and then passing the cold, dry building exhaust air required for good indoor air quality across the wetted surface of the precool heat exchanger. Said precooler providing lower power consumption of the compressor, lower head pressure, increased mass flow of the refrigerant and improved efficiency of the primary condenser of the air conditioning or heat pump system.

Said exhaust air could be used after first undergoing a sensible heat exchange with the incoming make up air on either the subcooler or precooler.

Finally, a combination subcooler and precooler system where the cold dry exhaust air is first used to evaporatively subcool the liquid refrigerant in the water wetted subcooler and then subsequently used to conductively cool the hot gas refrigerant passing through a dry surface precooler or alternately used to evaporatively cool the wetted surface of the precooler thereby evaporatively precooling the hot gas refrigerant passing through the precooler.

4 Claims, 5 Drawing Sheets

BUILDING EXHAUST AND AIR CONDITIONER CONDENSTATE (AND/OR OTHER WATER SOURCE) EVAPORATIVE REFRIGERANT SUBCOOL/PRECOOL SYSTEM AND METHOD THEREFOR

BACKGROUND OF THE INVENTION

1. Field of the Invention

The present invention relates to a subcool and/or precool system for the liquid refrigerant and/or hot gas discharge refrigerant of an air conditioning or heat pump system that utilizes the exhaust air required for clean air operation of a buildings' conditioned air supply and the condensate of said air conditioning or heat pump system (and/or other water source) to accomplish said subcooling and/or precooling for purposes of increasing the capacity and efficiency of said air conditioning or heat pump system.

The present invention further relates to a system for ducting the building exhaust air to said subcool and/or precool system. Said building exhaust air to be used after a preliminary sensible heat exchange with the required incoming make up air if possible.

The present invention also relates to a system for piping the condensate of said air conditioner and/or heat pump system (or other water source) to the subcooling and/or precooling heat exchangers.

Finally, the present invention additionally relates to a sump and pump system or capillary feed system for continually wetting the subcool and/or precool heat exchangers with the condensate (or other water source) while the exhaust air is blowing across the wetted subcool and/or precool heat exchangers for purposes of evaporatively subcooling and/or precooling the refrigerant.

This invention more particularly pertains to an apparatus and method comprising a building exhaust air and air conditioner condensate (or other water source) evaporative subcooler where said subcooler is serially located between the air conditioning system condenser and evaporator. This invention also more particularly pertains to an apparatus and method comprising a building exhaust air and air conditioning condensate (or other water source) evaporative precooler where said precooler is positioned serially between the air conditioning system compressor and condenser.

Next, this invention also more particularly pertains to an apparatus and method whereby said building exhaust air and air conditioner condensate (or other water source) may be first used to evaporatively subcool the liquid refrigerant and then the exhaust air and water are subsequently used to evaporatively precool the hot gas discharge refrigerant.

Further, this invention also more particularly pertains to an alternate apparatus and method whereby said building exhaust air and air conditioner or heat pump condensate (or other) water may be first used to evaporatively subcool the liquid refrigerant and then the exhaust air discharge from the subcooler only being used to conductively precool the hot gas discharge refrigerant.

Additionally, this invention more particularly pertains to an apparatus and method comprising a duct system that directly feeds the building exhaust air through said wetted subcooler and/or precooler or that feeds said building exhaust air, after sensible heat exchange with incoming make up air, to said wetted subcooler and/or precooler.

This invention also more particularly pertains to an apparatus and method for directing the condensate of an air conditioning and/or heat pump system to said subcooler and/or precooler. If condensate is not adequate or not available, another water source with a float control to keep the water level where needed can be directed to said subcooler and/or precooler.

Finally, this invention also more particularly pertains to an apparatus and method comprising either a pump and distribution system for keeping the subcooler and/or precooler heat exchanger surfaces wetted or a capillary system for accomplishing same.

2. Description of the Background Art

Presently there exist many types of devices designed to operate in the thermal transfer cycle. The vapor-compression refrigeration cycle is the pattern cycle for the great majority of commercially available refrigeration systems. This thermal transfer cycle is customarily accomplished by a compressor, condenser, throttling device and evaporator connected in serial fluid communication with one another. The system is charged with refrigerant, which circulates through each of the components. More particularly, the refrigerant of the system circulates through each of the components to remove heat from the evaporator and transfer heat to the condenser. The compressor compresses the refrigerant from a low-pressure superheated vapor state to a high-pressure superheated vapor state thereby increasing the temperature, enthalpy and pressure of the refrigerant. A superheated vapor is a vapor that has been heated above its boiling point temperature. It leaves the compressor and enters the condenser as a vapor at some elevated pressure where the refrigerant is condensed as a result of the heat transfer to cooling water and/or to ambient air. The refrigerant then flows through the condenser condensing the refrigerant at a substantially constant pressure to a saturated-liquid state. The refrigerant then leaves the condenser as a high pressure liquid. The pressure of the liquid is decreased as it flows through the expansion valve causing the refrigerant to change to a mixed liquid-vapor state. The remaining liquid, now at low pressure, is vaporized in the evaporator as a result of heat transfer from the refrigerated space. This vapor then enters the compressor to complete the cycle. The ideal cycle and hardware schematic for vapor compression refrigeration is shown in FIG. 1 as cycle 1-2-3-4-1. More particularly, the process representation in FIG. 1 is represented by a pressure-enthalpy diagram, which illustrates the particular thermodynamic characteristics of a typical refrigerant. The P-h plane is particularly useful in showing the amounts of energy transfer as heat. Referring to FIG. 1, saturated vapor at low pressure enters the compressor and undergoes a reversible adiabatic compression, 1-2. Adiabatic refers to any change in which there is no gain or loss of heat. Heat is then rejected at constant pressure in process 2-3. An adiabatic pressure change occurs through the expansion device in process 3-4, and the working fluid is then evaporated at constant pressure, process 4-1, to complete the cycle. However, the actual refrigeration cycle may deviate from the ideal cycle primarily because of pressure drops associated with fluid flow and heat transfer to or from the surroundings. It is readily apparent that the temperature of the liquid refrigerant plays an important role in the potential for removing heat in the evaporator phase of the thermal cycle. The colder the liquid refrigerant entering the evaporator, the greater the possible change in enthalpy or heat energy absorbed per unit mass of liquid available for vaporization and the colder the liquid refrigerant entering the expansion device leading to the evaporator, the lower the flash gas loss, which means a higher portion or percentage of mass is available for vaporization through the evaporator.

Finally, it is readily apparent that rapid precooling of the hot gas discharge from compressor lowers compressor power consumption, improves compressor efficiency and improves the primary condenser's performance. Many such devices and methods currently exist that are designed to accomplish this subcooling and precooling.

However, these known methods and devices have drawbacks. The drawbacks include high cost of accomplishing the subcooling and/or precooling, and/or the ineffectiveness or degrading effectiveness of the subcooling and/or precooling, method and/or device.

In response to the realized inadequacies of earlier methods and devices, and because of the requirement for a certain percentage of indoor air to continually be replaced for maintaining good indoor air quality, it became clear that there is a need for a liquid refrigerant subcooler for an air conditioning or heat pump system that has a low initial cost as well as having a method for utilizing the cold, dry air that is exhausted from a building air supply for purposes of maintaining good indoor air quality as well as for utilizing the condensate from said air conditioning or heat pump (or other water source) to accomplish said subcooling evaporatively.

It is also readily apparent that rapid precooling of the hot gas discharge from a compressor reduces head pressure, decreases power consumption, increases refrigerant mass flow and improves the efficiency of an air conditioner or heat pump system.

The use of the cold, dry exhaust air and the use of the condensate (or other water source) directly, or even after both being first used to subcool the liquid refrigerant, will provide this precooling in a very cost effective manner.

Therefore the principal objective of this invention is to provide an improvement which overcomes the aforementioned inadequacies of the prior art devices and provides an improvement which is a significant contribution to the advancement of the subcooler and precooler art for air conditioner or heat pump systems.

Another objective of the present invention is to provide a more constant subcooling over a wide range of air source or water source conditions.

Still another objective of the present invention is to provide an evaporative cooling process that will provide for subcooling of the liquid refrigerant of an air conditioning or heat pump system.

Yet another objective of the present invention is to provide increased cooling capacity by means of the subcooling of the liquid refrigerant.

Still yet another objective of the present invention is to provide rapid precooling of the hot gas refrigerant discharge from a compressor by utilizing the cold, dry, building exhaust air and condensate (or other water source) directly to provide an evaporative cooling process that will provide for precooling of the hot gas refrigerant or even after both exhaust air and water first being used to evaporatively subcool the liquid refrigerant.

Yet a further objective of the present invention is to provide an alternate means for precooling the hot gas refrigerant after first evaporatively subcooling the liquid refrigerant with the building exhaust air and water, whereby the exhaust air exiting the subcooler is used only to conductively cool the precool heat exchanger, which in turn precools the hot gas passing through the precooler.

And yet another objective of the present invention is to provide lower power consumption and increased pumping efficiency of the compressor, as well as to improve the primary condenser's performance.

Even yet another objective of the present invention is to provide a means for ducting and supplying the building exhaust air to the subcool and/or precool heat exchangers.

Yet a further objective of the present invention is to provide a means for capturing and directing the condensate of an air conditioning or heat pump system to the subcool and/or precool heat exchangers.

And yet another objective of the present invention is to provide a means for providing water directly to said precool and/or precool heat exchangers if condensate is not available or is not adequate.

Yet a further objective of the present invention is to provide a means for mechanical pumping or passive capillary pumping of said condensate or other water to said subcooler and/or precooler heat exchangers to keep said subcooler and/or precooler heat exchangers wetted.

The foregoing has outlined some of the pertinent objects of the invention. These objects should be construed to be merely illustrations of some of the more prominent features and applications of the intended invention. Many other beneficial results can be obtained by applying the disclosed invention in a different manner or by modifying the invention within the scope of the disclosure.

Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The present invention is defined by the appended claims with the specific embodiment shown in the attached drawings. The present invention is directed to a first apparatus that satisfies the need for increased refrigeration effect by means of increased liquid refrigerant subcooling accomplished evaporatively by utilizing the exhaust air required for clean air operation of a building's air supply and the condensate of said air conditioning or heat pump system and/or other water supply. For the purpose of summarizing this first apparatus and means of the invention, the liquid refrigerant line coming off of an air or water source condenser of an air conditioner or heat pump is serially connected to an air to refrigerant subcool heat exchanger before being connected to the line leading to the expansion device of an air conditioning or heat pump system. The cold, dry exhaust air from a building's air supply being directed across said subcool heat exchanger that is being kept wet by condensate (or other) water.

Simply, this first apparatus allows evaporative subcooling of the liquid refrigerant by means of the cold, dry building exhaust air and by means of evaporating the condensate (or other) water from the wetted surface of the subcool heat exchanger, which reduces the temperature of the remaining water and the surface of the subcool heat exchanger to the wet bulb temperature of the building exhaust air which in turn subcools the liquid refrigerant inside the tubes of the subcool heat exchanger. Both the building exhaust air and the condensate water are provided by the air conditioning or heat pump system needing the additional refrigeration effect caused by the refrigerant subcooling.

Moreover, this present invention may be configured by means of a second apparatus, that satisfies the need for lower power consumption, increased pumping efficiency of the compressor, as well as improving the primary condensers performance by means of increased hot gas refrigerant precooling accomplished by utilizing the cold, dry exhaust air required for clean air operation of a building's air supply and the air conditioning or heat pump systems condensate (or other) water supply to accomplish this precooling evaporatively or after first use in the subcooler of the first apparatus. Another alternative would be to precool the hot gas conductively with the cooler and higher humidity air being discharged from the evaporatively cooled subcooler. For the purposes of summarizing this second apparatus and means of the invention, the hot gas discharge line coming off of the compressor of an air conditioner or heat pump system is serially connected to an air to refrigerant precool heat exchanger before being connected to the hot gas line leading to the condenser. The cold, dry building exhaust air being directed (or after first being directed through the subcooler of the first apparatus) through said condensate (or other water supply) wetted precool heat exchanger or as an alternate, through a dry precool heat exchanger.

Simply, this second apparatus allows evaporative (or conductive) precooling of the hot gas refrigerant by means of the cold, dry building exhaust air and condensate (or other) water or by means of the discharge of the air and water (or air only) from the subcooler of the first apparatus where the cold, dry building exhaust and condensate (or other) water is first used to subcool the liquid refrigerant and then used subsequently to evaporatively (or conductively) precool the hot gas refrigerant.

The foregoing has outlined rather broadly, the more pertinent and important features of the present invention. The detailed description of the invention that follows is offered so that the present contribution to the art can be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more succinct understanding of the nature and objects of the present invention, reference should be directed to the following detailed description taken in connection with the accompanying drawings in which.

DETAILED DESCRIPTION OF THE PREFERRED EMBODIMENT

With reference to the drawings, and in particular to FIGS. 2, 2a, 3, 3a, 4, 4a, and 5 thereof, new and improved subcooling, and/or precooling devices for improved air conditioning capacity and/or increased efficiency, lower power consumption and improved primary condenser performance, embodying the principles and concepts of the present invention and generally designated by the reference number (10) for the subcooler only, and generally designated by the reference number (11) for the precooler only will be described.

Figure 1:
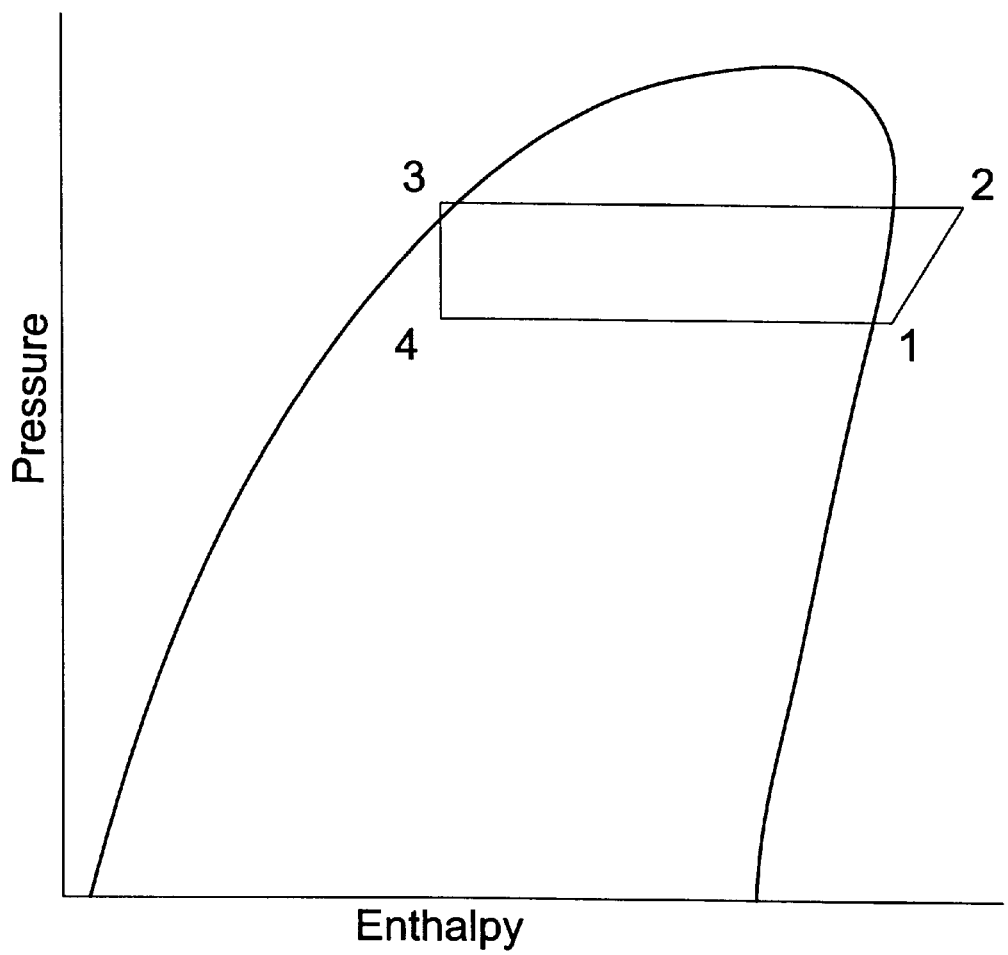
FIG. 1 is a representation of the refrigeration process on a pressure enthalpy diagram.
Figure 2:
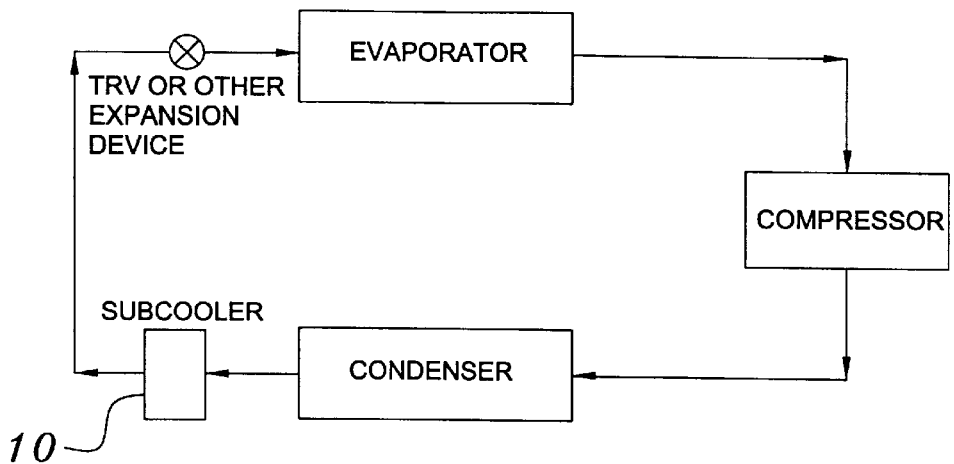
FIG. 2 is a hardware schematic of the vapor compression cycle for an air conditioner or heat pump system showing the location of the building exhaust air and condensate (or other) water evaporatively cooled subcooler.
Figure 2A:
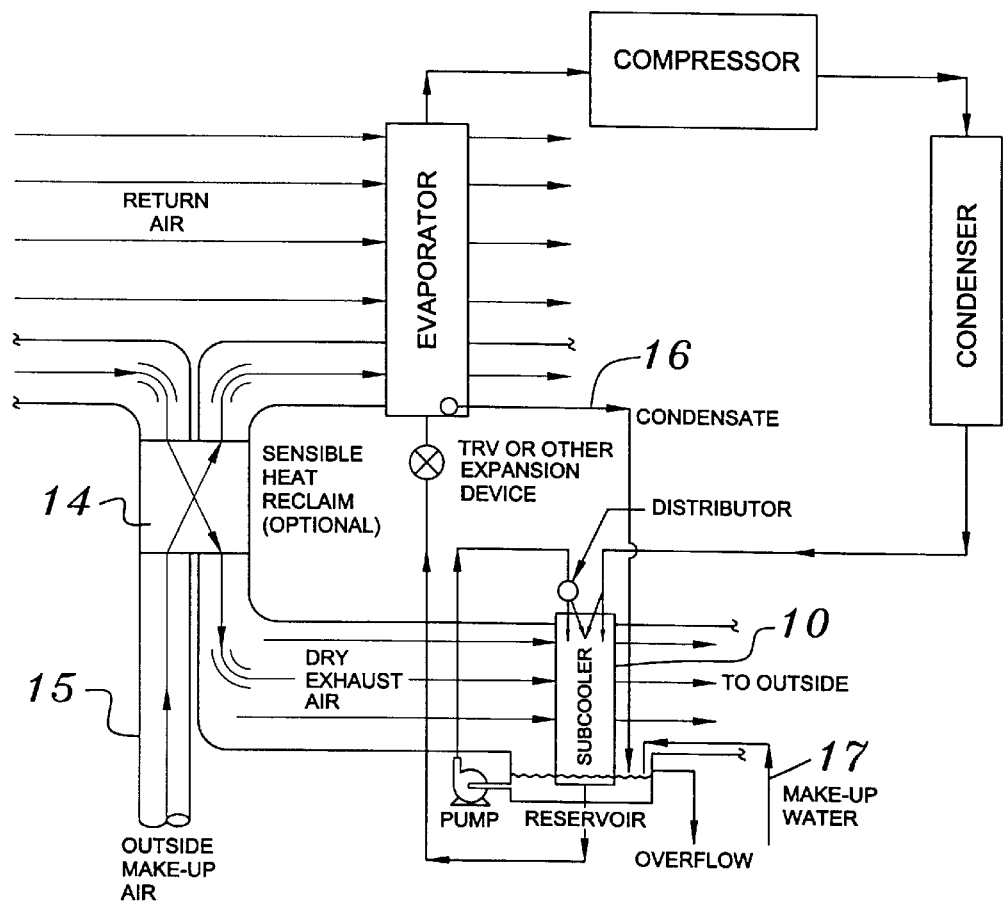
FIG. 2a is a perspective view showing the relationship between the liquid refrigerant subcool heat exchanger and a possible flow direction of the building exhaust air and the condensate (or other) water flow through said subcooler.

First, for the subcooler only (10), of the present invention, as illustrated in FIGS. 2, and 2a, a subcooler for the liquid refrigerant relies on evaporative cooling by a means of direct use of the dry, cold building exhaust air (12) required for good indoor air quality (or after the exhaust air first undergoing a sensible heat exchange (13) with the incoming make up air (14)) to evaporate the water supplied by the condensate discharge (15) from the air conditioning or heat pump system, and/or other water (16) supplied from a municipal or other water supply system, wetted subcooler, which in turn cools the liquid refrigerant in the subcooler.

Figure 3:
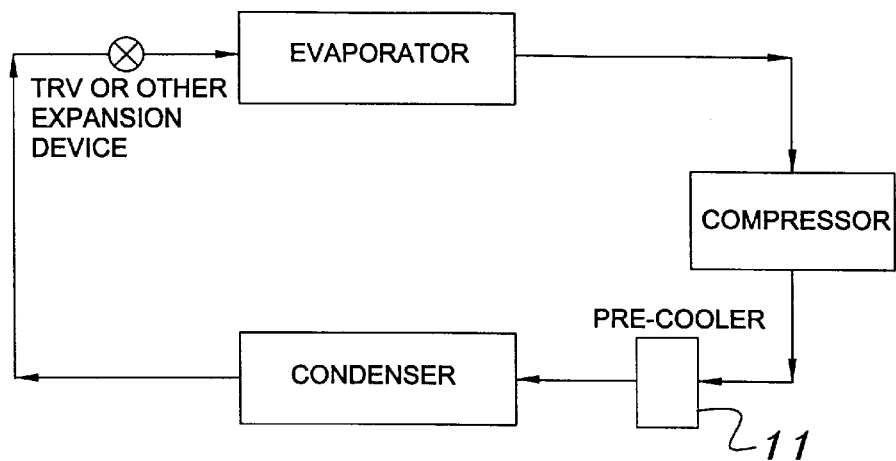
FIG. 3 is a hardware schematic of the vapor compression cycle for an air conditioner or heat pump system showing the location of the building exhaust air and condensate (or other) water evaporatively cooled precooler.
Figure 3A:
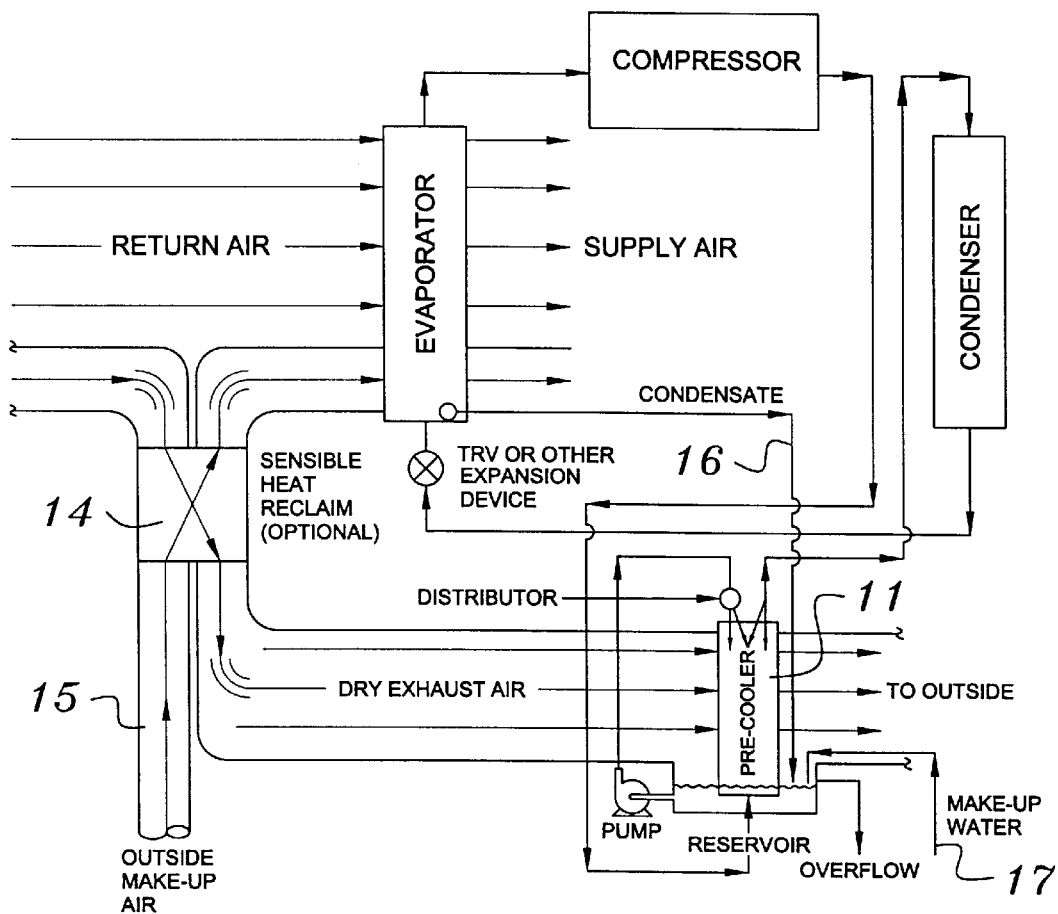
FIG. 3a is a perspective view showing the relationship between the hot gas refrigerant precool heat exchanger and a possible flow direction of the building exhaust air as well as the condensate (or other) water flow through said precooler.

The exhaust air (12) from a building's air supply is generally much more constant in temperature and humidity than is outside ambient air. Further, this exhaust air (12) is generally much cooler and dryer than outside air, especially when air conditioning loads are high. Even after a sensible heat exchange (13) with incoming make up air (14) the low wet bulb temperature of the outgoing air is not affected, and is substantially lower than that of the outside air supply. By passing this relatively dry air across a wetted surface both the sensible air temperature and the water temperature will approach that of the wet bulb temperature of the building exhaust air. A refrigerant passing through a heat exchanger that has been wetted and that has the relatively dry air passing across it will be cooled by the evaporative cooling effect created by the dry air evaporating the water on the heat exchanger. For the precooler system only (11) of the present invention, as illustrated in FIGS. 3 and 3a, a precooler for the hot gas refrigerant also relies on evaporative cooling, by means of a direct use of the dry, cold building exhaust air required for good indoor air quality and the use of water supplied by the condensate discharge from the air conditioning or heat pump system and/or other water supply system to precool the hot gas refrigerant flowing through the precooler.

Figure 4:
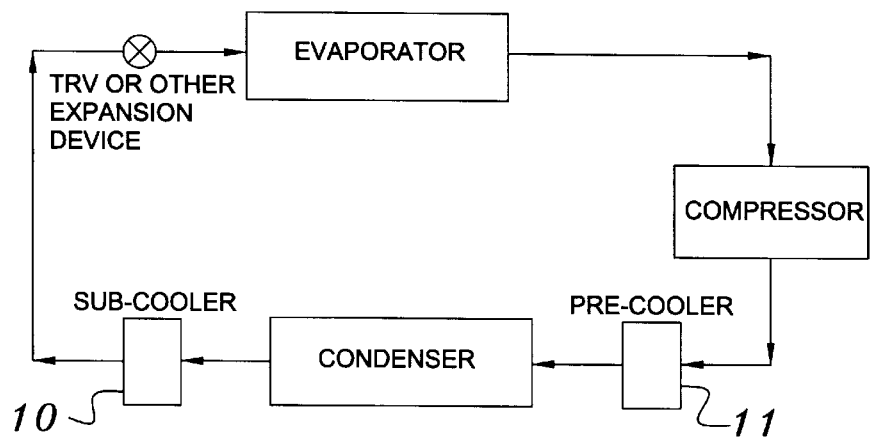
FIG. 4 is a hardware schematic of the vapor compression cycle for an air conditioner or heat pump system showing the location of the combined building exhaust air and condensate (or other) water evaporatively cooled subcooler plus secondary use combined building exhaust air and condensate (or other) water evaporatively (or if exhaust air used only, conductively) cooled precooler.
Figure 4A:
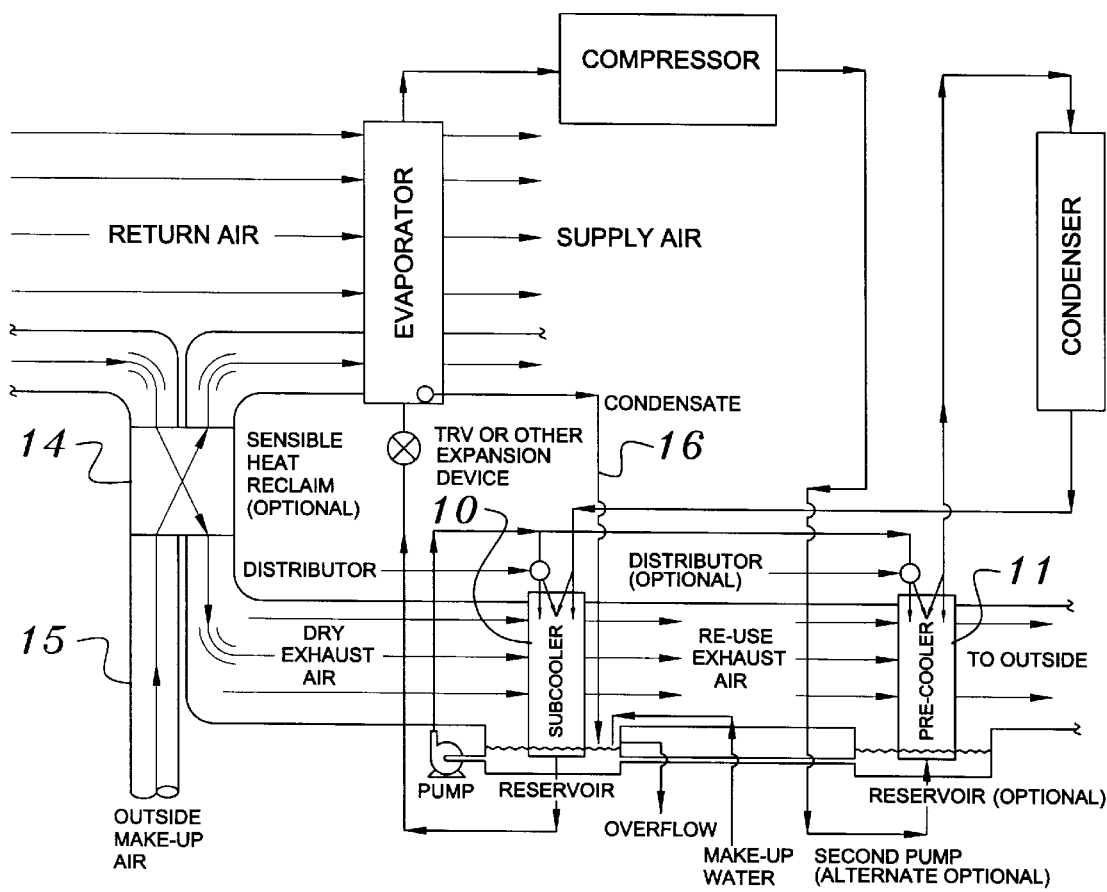
FIG. 4a is a perspective view showing the relationship between the liquid refrigerant subcool heat exchanger and the hot gas refrigerant precool heat exchanger and a possible flow direction of the building exhaust air as well as the condensate (or other) water (or exhaust air only for the precooler) flows through said subcooler and precooler.

For the subcooler (10) plus precooler (11) combination of the present invention, as illustrated in FIGS. 4 and 4a, a subcooler (10) for the liquid refrigerant and a precooler (11) for the hot gas refrigerant relies on an evaporative cooling process that will be used twice; a first use of the dry, cold building exhaust air and condensate (or other) water supply that will first evaporatively cool the subcool heat exchanger which in turn cools the liquid refrigerant flowing through the subcooler and then the air supply passing out of the subcooler will flow through the wetted precooler to evaporatively cool the precool heat exchanger which in turns cools the hot gas refrigerant flowing through the precooler. The subcooler and precooler to be connected in serial communication in the refrigeration cycle as shown in FIG. 4. The precooler may or may not be wetted for this secondary use of the air discharging through the subcooler. If not wetted, the precool heat exchanger is conductively cooled by the exhaust air supply, exiting the subcooler only.

Figure 5:
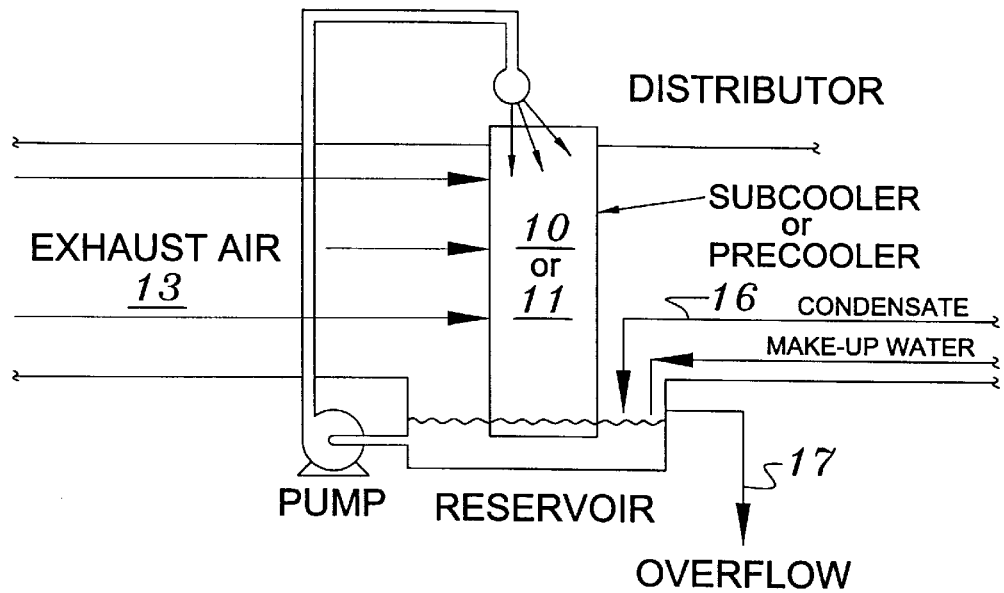
FIG. 5 is a hardware schematic showing some of the possible pump and control mechanisms for controlling the flow of condensate (or other) water across the subcooler and/or precooler heat exchangers.
Figure 5A:
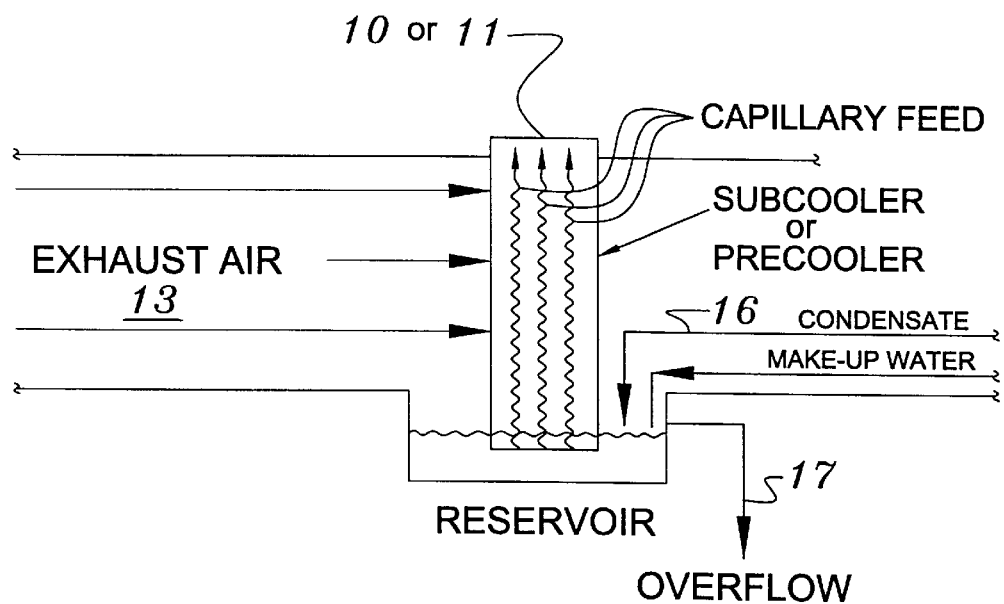

FIG. 5 is illustrative of some of the possible pump and control mechanisms for controlling the flow of condensate (or other) water across the subcooler and/or precooler heat exchangers. The methods illustrated include a mechanically pumped method whereby water is distributed across the top of the subcool and/or precool heat exchangers and allowed to flow down through the heat exchanger(s), perpendicular to the flow of the cold, dry building exhaust air and they include a passive capillary feed method that pulls water up onto the surface of the heat exchanger by means of the surface tension of water.

The increase in efficiency due to subcooling is well known and is due to the increase in capacity due to subcooling of the liquid refrigerant. What is unique in this invention is the innovative use of the cold, dry building exhaust air required for good indoor air quality and the use of condensate (or other) water to accomplish subcooling evaporatively.

The increased efficiency of the refrigeration cycle due to precooling is due to lower head pressure, higher compressor efficiency and more efficient use of the primary condenser. The unique and innovative use of the cold, dry building exhaust air required for good indoor air quality and the use of condensate (or other) water to accomplish precooling evaporatively, or to accomplish precooling conductively by using the exhaust air only after first use in the subcooler, is extremely cost effective.

The present disclosure includes that contained in the appended claims, as well as that of the foregoing description. Although this invention has been described in its preferred form with a certain degree of particularity, it could be understood that the present disclosure of the preferred form has been made only by way of example and that numerous changes in the details of construction and the combination and arrangement of parts may be resorted to without departing from the spirit and scope of the invention.

Now that the invention has been described, what is claimed is:

1. A heat exchange refrigerant subcool system that utilizes stored condensate water from an air conditioner or heat pump and make-up water that is then pumped across a heat exchanger while the cold, dry building exhaust air is passed over said heat exchanger for evaporatively subcooling a liquid refrigerant that has already passed through the condenser of said air conditioner or heat pump, comprising in combination:

a) a subcooler connected in fluid communication with the output of the condenser enabling the refrigerant to flow through said subcooler after first flowing through the condenser;

b) a reservoir the subcooler sits in that receives the condensate discharge from said air conditioner or heat pump and that also receives any needed make-up water;

c) said subcooler connected in fluid communication with the output of a pump that pumps the stored condensate and make-up water through a control system that enables the correct amount of water to flow across and wet the surface of said subcooler for evaporative cooling thereof and then back to storage in the reservoir;

d) said wetted subcooler connected in fluid communication with the cold, dry building exhaust air that subsequently cools by evaporation the condensate and make-up water flowing over the subcooler which in turn subcools the liquid refrigerant in the subcooler; and e) a means for said water to overflow to discharge, whereby said subcooler utilizes said evaporative cooling process for providing maximum available subcooling to the liquid refrigerant of an air conditioner or heat pump.

2. A heat exchange refrigerant precool system that utilizes the condensate water discharge from an air conditioner or heat pump and make-up water supply that is then pumped across a heat exchanger while the cold, dry building exhaust air is also passing over said precool heat exchanger for evaporatively precooling a hot gas refrigerant before said hot gas refrigerant passes into the condenser of said air conditioner or heat pump, comprising in combination:

a) a precooler connected in fluid communication with the output of a compressor, enabling the hot gas refrigerant to flow through said precooler before passing into the condenser;

b) a reservoir the precooler sits in that receives the condensate discharge from said air conditioner or heat pump and that also receives any needed make-up water;

c) said precooler connected in fluid communication with the output of a pump that pumps stored condensate water through a control system that enables the correct amount of condensate and make-up water to flow across and wet the surface of said precooler for evaporative cooling thereof and then back to storage;

d) said wetted precooler further connected in fluid communication with cold, dry building exhaust air that subsequently cools by evaporation the condensate and make-up water flowing over the precooler which in turn precools the hot gas refrigerant flowing through said precooler; and e) a means for said water to overflow to discharge, whereby said precooler utilizes said evaporative cooling process for providing maximum available precooling to the refrigerant before said refrigerant passes into the condenser of said air conditioner or heat pump.

3. A combination subcool and precool heat exchanger system that utilizes stored condensate water from an air conditioner or heat pump and any needed make-up water that is first pumped across a first heat exchanger while the cold, dry building exhaust air is also passed over said first heat exchanger for first evaporatively subcooling the liquid refrigerant that has passed through the condenser of said air conditioner or heat pump and then the air exhausting from the first heat exchanger subsequently passed through a second water wetted heat exchanger (a precooler) for subsequently precooling the hot gas discharge refrigerant from a compressor before said refrigerant passes into the condenser of said air conditioner or heat pump, comprising in combination:

a) the first heat exchanger, a subcooler connected in fluid communication with the output of the condenser, enabling the refrigerant to flow through said subcooler after first flowing through the condenser;

b) the second heat exchanger, a precooler connected in fluid communication with the output of a compressor, enabling the hot gas refrigerant to flow through said precooler before passing into the condenser;

c) a reservoir system the subcooler and precooler sits in that receives the condensate and make-up water supplies;

d) said subcooler and precooler connected in fluid communication with the output of a pump that pumps the stored condensate and make-up water through a control system that enables the correct amount of condensate and makeup water to flow across and wet the surfaces of said subcooler and said precooler for evaporative cooling thereof;

e) said subcooler further connected in fluid communication with cold, dry building exhaust air that subsequently cools by evaporation the water flowing over the subcooler which in turn cools the liquid refrigerant flowing through the subcooler; and f) said precooler connected in fluid communication with the airflow output of the subcooler of the previously used building exhaust air, said previously used building exhaust air passing through said condensate and make-up water supply wetted precooler heat exchanger, where said exhaust air cools by evaporation the water flowing over the precooler which in turn precools the hot gas refrigerant flowing through the precooler; and g) means for said condensate and make-up water to overflow to discharge, whereby said subcool and precool system utilizes said evaporative cooling for providing maximum available subcooling to the liquid refrigerant and maximum available precooling to the hot gas discharge refrigerant of said air conditioner or heat pump.

4. A combination subcool and precool heat exchanger system that utilizes the stored condensate water from an air conditioner or heat pump and any needed make-up water coupled with the use of the cold, dry building exhaust air for first evaporatively subcooling the liquid refrigerant that exists from a condenser of an air conditioner or heat pump and then using only the air exiting the subcooler to conductively cool a second dry heat exchanger (the precooler), for precooling the hot gas discharge refrigerant from a compressor before said refrigerant passes into the condenser of said air conditioner or heat pump comprising in combination;

a) the first heat exchanger, a subcooler connected in fluid communication with the output of the condenser, enabling the refrigerant to flow through said subcooler after first flowing through the condenser;

b) said precooler connected in fluid communication with the airflow output of the subcooler of the previously used building exhaust air, said previously used building exhaust air passing through said condensate and make-up water supply wetted precooler heat exchanger, where said exhaust air cools by evaporation the water flowing over the precooler which in turn precools the hot gas refrigerant flowing through the precooler;

c) said subcooler placed in a first water storage tank that receives the discharge of condensate water from said air conditioner or heat pump and any needed water where said water wets the surface of said subcooler and where said surface is cooled evaporatively by means of the cold, dry building exhaust air passing over the wetted surfaces of said subcool heat exchanger;

d) a means for excess of said condensate and make-up water to overflow to drainage; and e) said precooler connected in fluid communication with the air flow output of the subcool heat exchanger where the previously used exhaust air discharging from the evaporatively cooled subcooler passes through a non-wetted surface precooler for conductively cooling the hot gas refrigerant passing through the precool heat exchanger.

* * * * *